(12) United States Patent
Yamamoto et al.

(10) Patent No.: US 12,190,689 B2
(45) Date of Patent: Jan. 7, 2025

(54) SHOPPING CART

(71) Applicant: Toshiba Tec Kabushiki Kaisha, Tokyo (JP)

(72) Inventors: Souichi Yamamoto, Yokohama Kanagawa (JP); Yasuhiro Ono, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/504,173

(22) Filed: Nov. 8, 2023

(65) Prior Publication Data

US 2024/0273980 A1  Aug. 15, 2024

(30) Foreign Application Priority Data

Feb. 13, 2023  (JP) ................................. 2023-020077

(51) Int. Cl.
*G07G 1/01* (2006.01)
*G07G 1/00* (2006.01)
(52) U.S. Cl.
CPC ............. *G07G 1/0018* (2013.01); *G07G 1/01* (2013.01)
(58) Field of Classification Search
CPC ................................ G07G 1/0018; G07G 1/01
USPC ....................................................... 235/383
See application file for complete search history.

(56) References Cited

U.S. PATENT DOCUMENTS

| | | | | |
|---|---|---|---|---|
| 5,250,789 A | * | 10/1993 | Johnsen | B62B 3/1424 705/14.4 |
| 5,773,954 A | * | 6/1998 | VanHorn | G07G 1/0045 320/137 |
| 5,821,512 A | * | 10/1998 | O'Hagan | H01M 10/44 235/383 |
| 11,636,533 B1 | * | 4/2023 | Vora | B62B 3/1408 705/27.1 |
| 11,704,513 B2 | * | 7/2023 | Iizaka | G06K 7/1413 235/383 |
| 2004/0262385 A1 | * | 12/2004 | Blaeuer | B62B 3/1416 235/383 |
| 2006/0254861 A1 | * | 11/2006 | Perrier | G07F 7/0627 186/26 |
| 2008/0230603 A1 | | 9/2008 | Stawar et al. | |

(Continued)

FOREIGN PATENT DOCUMENTS

| | | |
|---|---|---|
| CN | 201882122 U | 6/2011 |
| EP | 4045383 A1 | 8/2002 |

(Continued)

OTHER PUBLICATIONS

Extended European Search Report mailed May 22, 2024 in corresponding European Patent Application No. 23212269.7, 8 pages.

*Primary Examiner* — Daniel A Hess
(74) *Attorney, Agent, or Firm* — Kim & Stewart LLP (57) ABSTRACT

A shopping cart includes a cart body, a handle attached to the cart body on a front side thereof, a terminal attached to the cart body and including a display screen on a rear side of the cart body and on which information of an item stored in the shopping cart can be displayed, and a basket table attached to the cart body at a position lower than the display screen and the handle and located between the display screen and the handle when viewed from above.

19 Claims, 9 Drawing Sheets

(56) References Cited

U.S. PATENT DOCUMENTS

| | | | | |
|---|---|---|---|---|
| 2008/0237339 | A1* | 10/2008 | Stawar | B62B 3/142 |
| | | | | 235/383 |
| 2008/0308630 | A1* | 12/2008 | Bhogal | G07G 1/009 |
| | | | | 235/383 |
| 2010/0058633 | A1* | 3/2010 | Sonnendorfer | G09F 23/06 |
| | | | | 40/606.03 |
| 2011/0221149 | A1* | 9/2011 | Crum | G06Q 30/06 |
| | | | | 40/124.06 |
| 2012/0296751 | A1* | 11/2012 | Napper | G06Q 20/208 |
| | | | | 705/23 |
| 2021/0174405 | A1 | 6/2021 | Misawa | |
| 2024/0132131 | A1 | 4/2024 | Marczak | |

FOREIGN PATENT DOCUMENTS

| | | | |
|---|---|---|---|
| EP | 3832563 | A1 | 6/2021 |
| JP | 2021-187306 | A | 12/2021 |

* cited by examiner

SHOPPING CART

CROSS-REFERENCE TO RELATED APPLICATION(S)

This application is based upon and claims the benefit of priority from Japanese Patent Application No. 2023-020077, filed Feb. 13, 2023, the entire contents of which are incorporated herein by reference.

FIELD

Embodiments described herein relate generally to a shopping cart.

BACKGROUND

In recent years, shopping carts equipped with a display device for displaying information of an item for a customer, are becoming popular in stores such as supermarkets. Such shopping carts are used by many customers, and therefore are stored at a designated place in an overlapping or nested manner after use. The display device is located on the customer side (i.e., the front side) of a basket table so as not to interfere with the other shopping carts when the shopping carts are stored in an overlapping manner.

Since the display device is provided on the customer side of the basket table, the display device may hinder a customer from placing or taking out an item into or from the basket. In addition, items stored in the basket are hidden by the display device and are difficult to be seen by the customer. When the size of the display device is increased, it becomes more difficult to place or take out an item into or from the basket, and items in the basket become more difficult to be seen.

SUMMARY OF THE INVENTION

Embodiments of the present invention provide a shopping cart that is convenient and easy to use.

In one embodiment, a shopping cart comprises a cart body, a handle attached to the cart body on a front side thereof, a terminal attached to the cart body and including a display screen on a rear side of the cart body and on which information of an item stored in the shopping cart can be displayed, and a basket table attached to the cart body at a position lower than the display screen and the handle and located between the display screen and the handle when viewed from above.

DETAILED DESCRIPTION

Hereinafter, embodiments will be described in detail with reference to the drawings. Note that the drawings used in the following description may be simplified or omitted for clarity of explanation.

Figure 1:
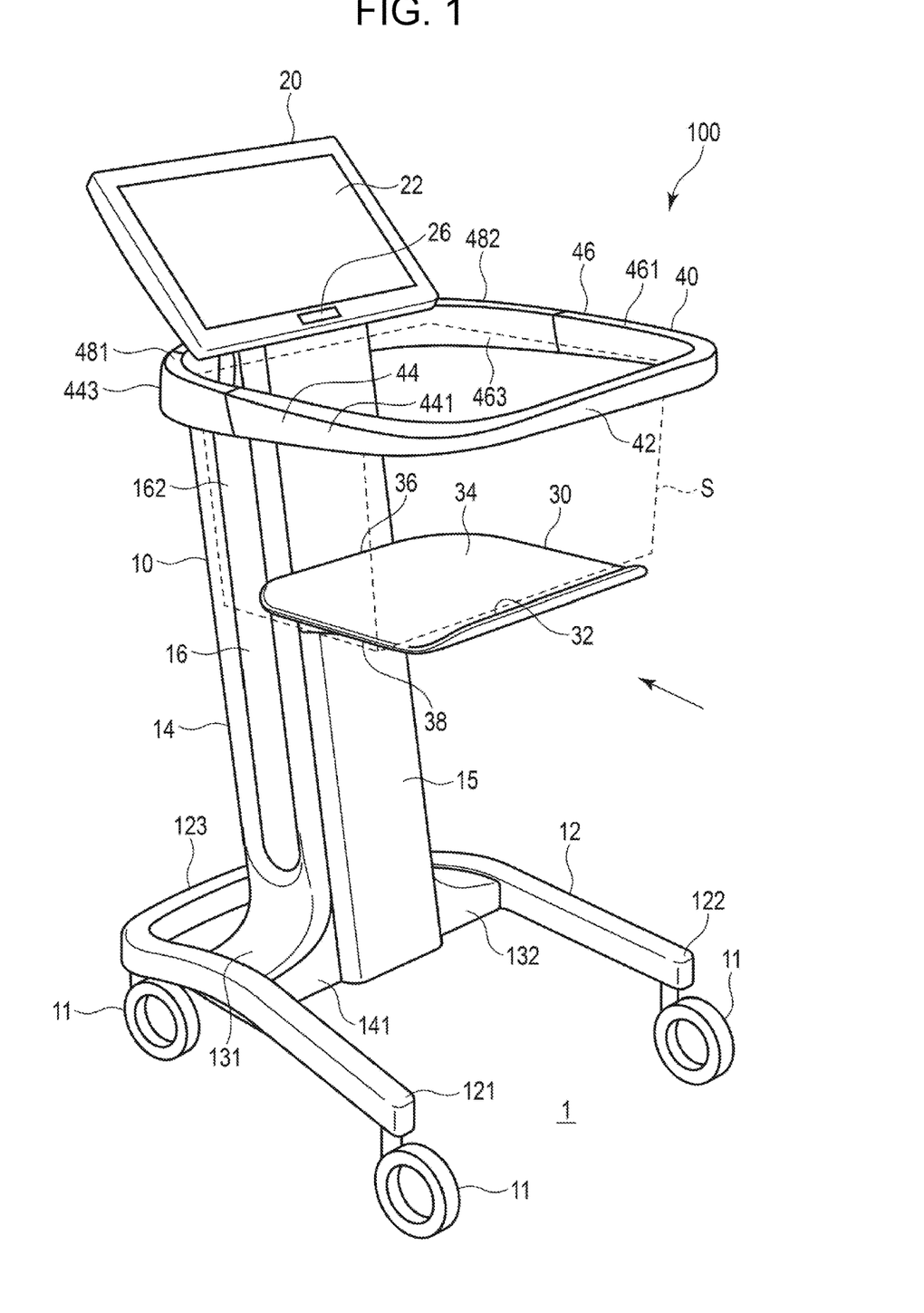
FIG. 1 is a perspective view of a shopping cart according to an embodiment.
Figure 2:
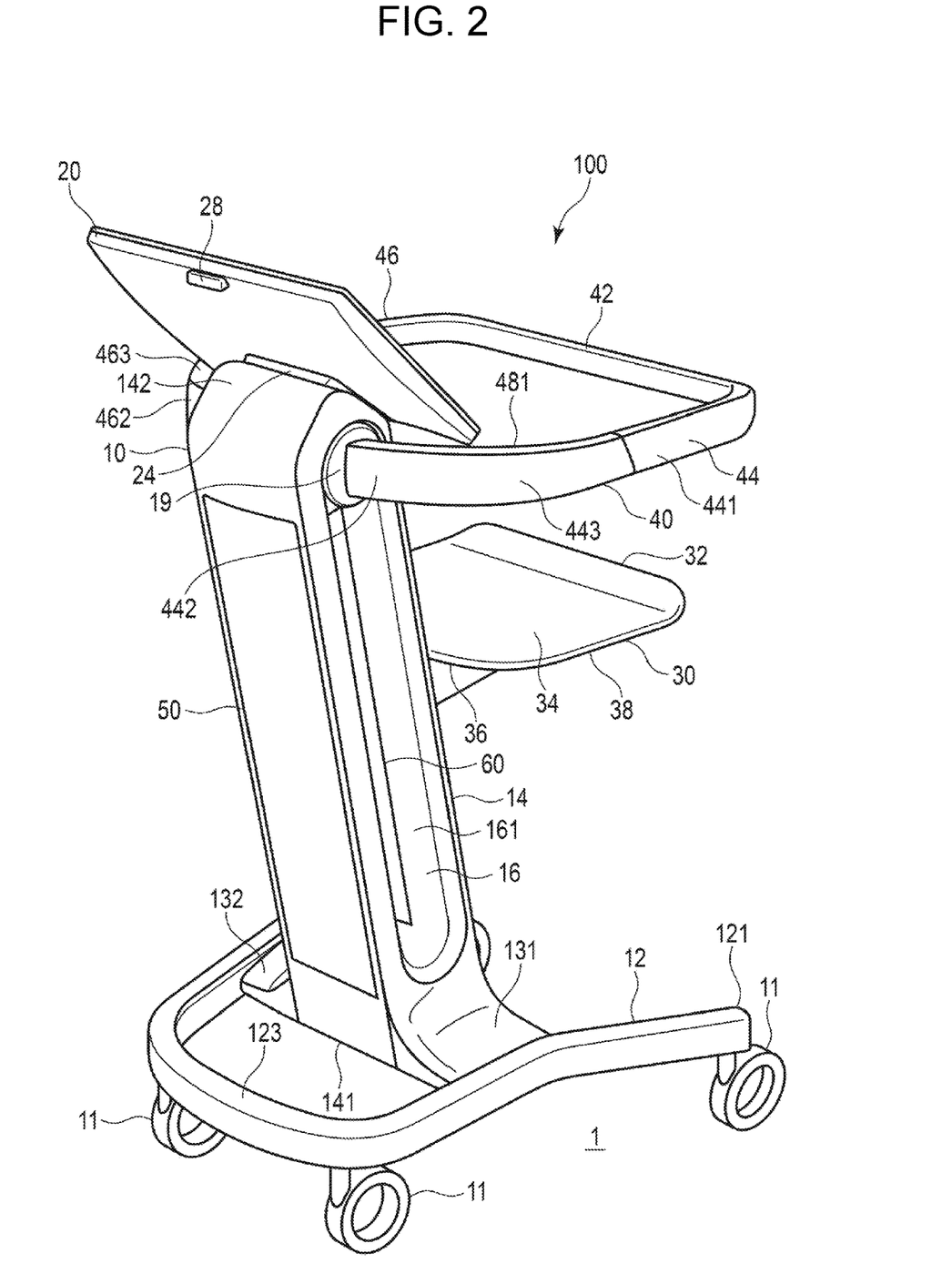
FIG. 2 is a perspective view of the shopping cart as viewed from the rear side.

As illustrated in FIGS. 1 and 2, a shopping cart 100 according to an embodiment includes a cart body 10, a customer service device 20, a basket table 30, and an arm 40. In the following description, the vertical direction and the horizontal direction of the shopping cart 100 are defined as viewed from a user P (i.e., the arrow direction in FIG. 1) who grasps a gripping portion or handle 42 of the arm 40 and faces a display screen 22 of the customer service device 20. In addition, a side where the basket table 30 and the arm 40 are attached to the cart body 10 is defined as a front side of the shopping cart 100, and a back side of the customer service device 20 is defined as a rear side of the shopping cart 100. In the shopping cart 100, the display screen 22 side that faces the user P with respect to the body of the customer service device 20 can be referred to as the front side of the shopping cart 100. For this reason, the direction in which the shopping cart 100 moves when the shopping cart 100 is pushed by the user P who is gripping the gripping portion 42 is the direction from the front side to the rear side of the shopping cart 100 (i.e., the arrow direction in FIG. 1). The front side of the shopping cart 100 may be referred to as the upstream side of the shopping cart 100 in the traveling direction, and the rear side of the shopping cart 100 may be referred to as the downstream side of the shopping cart 100 in the traveling direction.

The cart body 10 includes a leg frame 12 and a support portion 14. The leg frame 12 has a structure in which a metal pipe having a rectangular cross section is bent into a substantially U shape. The opening between the left and right ends 121 and 122 of the leg frame 12 is located on the front side of the shopping cart 100 so that the feet of the user P who is pushing the shopping cart 100 do not interfere with the leg frame 12. The leg frame 12 includes four casters 11 on the lower surface side thereof. Two of the four casters 11 are on the left and right ends 121 and 122 on the front side of the leg frame 12, and the other two casters 11 are on a curved portion 123 extending in the horizontal direction on the back side of the leg frame 12. The four casters 11 allow the shopping cart 100 to freely move on the floor surface 1 of the store.

The support portion 14 has a substantially quadrangular prism shape, and lateral frames 131 and 132 connected to the leg frame 12 are integrally provided on both left and right sides of the lower end 141 of the support portion 14. The left lateral frame 131 extends generally horizontally leftward from the lower end 141 and is integrally connected to an intermediate portion between the left end 121 and the curved portion 123 of the leg frame 12. The right lateral frame 132 extends substantially horizontally rightward from the lower end 141 and is integrally connected to an intermediate portion between the right end 122 of the leg frame 12 and the curved portion 123. In other words, the leg portion frame 12 supports the support portion 14 via the lateral frames 131 and 132.

The support portion 14 is slightly tilted rearward of the shopping cart 100 from the lower end 141 toward the upper end 142. The tilt angle of the support portion 14 with respect to the vertical direction is, for example, about 10 degrees. Thus, the upper end 142 of the support portion 14 is located above the curved portion 123 of the leg frame 12. By tilting the support portion 14 backward, the center of gravity of the shopping cart 100 can be brought close to the center of the four casters 11 in the front-rear direction in a state in which the basket 2 is placed on the basket table 30 provided in front of the support portion 14 and the item is put therein, and the shopping cart 100 can be stably driven.

On the front surface of the support portion 14, there is a storage portion 15 that accommodates a battery. On the rear surface of the support portion 14, there is a solar panel 50 that generates electric power by receiving illumination light in the store. Instead of the solar panel 50, an advertising monitor or a point-of-purchase (POP) space may be provided. At least one of the four casters 11 may include a generator that generates electricity by rotation of the caster 11. The battery can be charged by power generation by the solar panel 50 or the caster 11. In addition, when the shopping cart 100 is stored at a predetermined storage location as described later, the battery can be charged by being connected to a charging connector installed at the storage location. The battery supplies power to the customer service device 20, arm lamps 481 and 482, and a rotary beacon light 60.

The support portion 14 has a long hole 16 that extends in the vertical direction. The upper end of the long hole 16 terminates near the upper end 142 of the support portion 14, and the lower end of the long hole 16 terminates near the lower end 141 of the support portion 14. On an inner surface 161 of the front side of the long hole 16, there is a rotary beacon light 60 capable of changing the color of the light to be emitted or changing the light emission form (e.g., between lighting and blinking). Another inner surface 162 opposite side the long hole 16 opposite the rotary beacon light 60 serves as a reflective surface that reflects the light of the rotary beacon light 60.

When the rotary beacon light 60 is attached to the inner surface of the long hole 16 passing through the support portion 14 in the horizontal direction, light from the rotary beacon light 60 can be seen from substantially all directions of the shopping cart 100. In addition, since the rotary beacon light 60 is attached to the inner surface 161 on the front side of the long hole 16, it is unlikely that the user P who uses the shopping cart 100 directly views the rotary beacon light 60, and the reflected light from the reflecting surface on the opposite side of the long hole 16 or the reflected light from the inner surface of the arm 40 to be described later is seen. Therefore, it is possible to increase the amount of light of the rotary beacon light 60, and it is possible to make the light of the rotary beacon light 60 easily visible from a store clerk who is far away.

The basket table 30 is a horizontally long and substantially rectangular-shaped plate, and has a shape in which an edge 32 of rotation, which is one long side, is slightly bent upward. The four corners of the basket table 30 are rounded in an arc shape. The basket table 30 is rotatably connected to an intermediate portion in the vertical direction of the support portion 14 in front of the support portion 14. The height of the basket table 30 is determined by the height of the arm 40, which will be described later, the height of the customer service device 20, and the height up to the opening of the basket 2 (see FIG. 3) to be placed on a placing surface 34 of the basket table 30. The basket 2 is a generic term for a resin basket for storing items provided by a store, a shopping bag brought by the user P, and the like.

Figure 3:
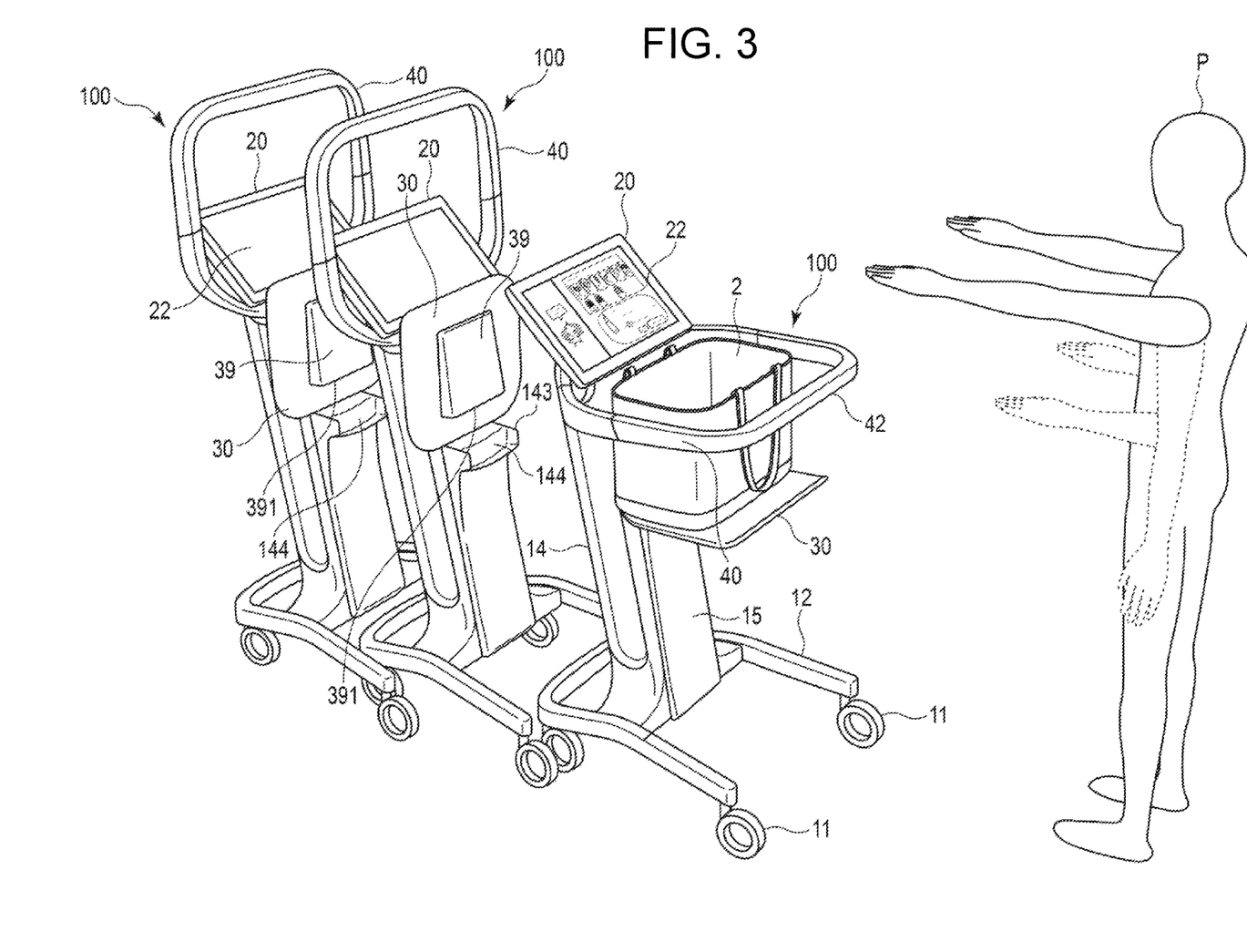
FIG. 3 is a perspective view illustrating shopping carts that are stored in an overlapping manner.

The basket table 30 is rotatable about a rotation shaft 18 (see FIG. 4) to a use state shown in FIGS. 1 and 2 and a stored state shown in FIG. 3. The rotation shaft 18 extends in the horizontal direction, and rotatably connects a base end 36 of the rotation of the basket table 30 with respect to the support portion 14. When the basket table 30 is in the use state, the placing surface 34 thereof is substantially horizontal. When the basket table 30 is arranged in the stored state, it is in a posture (for example, the posture of FIG. 4B) in which the front edge 32 is flipped upward.

The basket table 30 is integrally provided with a stopper 39 (see FIG. 3) having a substantially rectangular block shape on a rear surface 38 opposite to the placing surface 34. When the basket table 30 is rotated in the use state shown in FIGS. 1 and 2, the stopper 39 abuts against an abutment surface 144 of an abutment portion 143 projecting from the front surface of the support portion 14, the basket table 30 has a locking surface 391 for prohibiting further rotation downward. The locking surface 391 is an end surface of the stopper 39 on the rotation shaft 18 side, and is a surface orthogonal to the rear surface 38 of the basket table 30. The basket table 30 includes a weight sensor for detecting the weight of items or a basket 2 placed on the basket table 30 in the use state.

The arm 40 has a shape in which an elongated rod-shaped member is bent into a substantially rectangular ring shape. The arm 40 may be formed by a hollow pipe. The four corners of the arm 40 are gently curved. The arm 40 has integrally a gripping portion 42 extending in the lateral direction to be gripped by the user P, an L-shaped left portion 44 connected to the upper end 142 of the support portion 14 continuously to the left end of the gripping portion 42, and an L-shaped right portion 46 connected to the upper end 142 of the support portion 14 continuously to the right end of the gripping portion 42. In the present embodiment, the gripping portion 42 is disposed to face the customer service device 20 in the use state, and is gripped by the user P in order to move the shopping cart 100. Specifically, the gripping portion 42 is disposed at a position upstream of the customer service device 20 and the shopping cart 100 in the traveling direction and facing the customer service device 20. It can also be said that the gripping portion 42 is located between the customer service device 20 and the user P. Note that the user P may grip the left portion 44 and the right portion 46.

With the arm 40 in the horizontal use state shown in FIGS. 1 and 2, the left portion 44 integrally has a vertical portion 441 extending rearward from the left end of the gripping portion 42 and a lateral portion 442 extending rightward from the rear end of the vertical portion 441 toward the upper end 142 of the post portion 14. Further, the right portion 46 integrally has a vertical portion 461 extending rearward from the right end of the gripping portion 42 and a lateral portion 462 extending leftward from the rear end of the vertical portion 461 toward the upper end 142 of the support portion 14. The end of the lateral portion 442 of the left portion 44 on the side of the support portion 14 and the end of the lateral portion 462 of the right portion 46 on the side of the support portion 14 are pivotally coupled to the upper end 142 of the support portion 14 via a rotation shaft 19. The rotation shaft 19 extends in the horizontal direction above the rotation shaft 18 (see FIGS. 4A and 4B).

The arm 40 is rotatable about the rotation shaft 19 to a use state illustrated in FIGS. 1 and 2 and a stored state illustrated in FIG. 3. The arm 40 has a shape surrounding the outside of a storage space S (FIG. 1) for the basket 2 so that the basket 2 can be placed on the basket table 30 in the use state. When the arm 40 is in the use state, the gripping portion 42 is spaced apart from the customer service device 20 on the front side with the storage space S interposed therebetween. The arm 40 can be rotated between the use state and the stored state while the basket 2 is placed on the basket table 30, and has a size and a shape that do not interfere with the basket 2 in the middle of the rotation. Further, the arm 40 restricts the lateral movement of the basket 2 placed on the basket table 30 in the use state.

The storage space S in which the basket 2 is placed is surrounded by the gripping portion 42, the left portion 44, and the right portion 46 of the arm 40. The storage space S is below the customer service device 20 and between the gripping portion 42 and the customer service device 20. Therefore, the upper end opening portion of the basket 2 placed on the basket table 30 in the storage space S is lower than the lower end of the customer service device 20. That is, the height of the basket table 30 arranged in the use state is a height at which the upper end opening portion of the basket 2 placed on the basket table 30 is at least lower than the lower end of the customer service device 20.

The size of the basket table 30 and the arm 40 in the front-rear direction is shorter than the size thereof in the width or horizontal direction. As described above, because of the horizontally long storage space S between the gripping portion 42 of the arm 40 and the customer service device 20, the user P can easily reach and operate the customer service device 20 without decreasing the storage space S.

Figure 5:
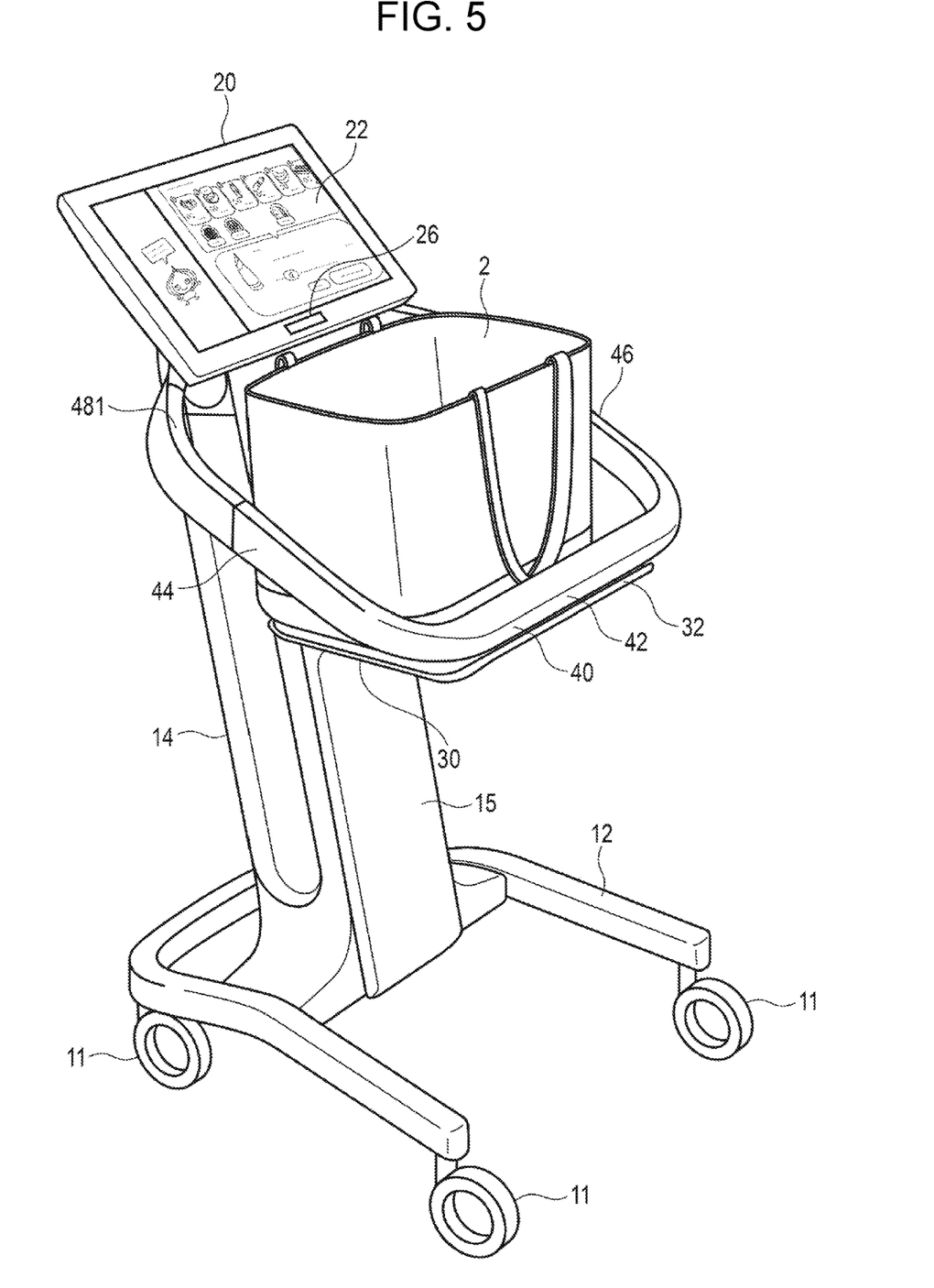
FIG. 5 is a diagram illustrating the arm of the shopping cart in a tilted state.

Further, the arm 40 is rotatable about the rotation shaft 19 in the tilted state shown in FIG. 5. When the arm 40 is in the tilted state, the arm 40 is rotated about the rotation shaft 19 to lower the gripping portion 42 below the use state. In this state, the gripping portion 42 may contact the basket table 30. The arm 40 is rotatable between the use state and the tilted state while the basket 2 is placed on the basket table 30. When the arm 40 is rotated to the tilted state of FIG. 5, the basket 2 placed on the basket table 30 can be easily taken out from the basket table 30, and the basket 2 can be easily placed on the basket table 30.

The arm 40 includes an arm ramp 481 on the upper surface of the curved portion 443 that joins the vertical portion 441 and the lateral portion 442 of the left portion 44. The arm 40 includes an arm ramp 482 on the upper surface of the curved portion 463 that joins the vertical portion 461 and the horizontal portion 462 of the right portion 46. When the arm lamps 481 and 482 are provided at those positions, they are easily recognized by the user P facing the display screen 22. The arm lamps 481 and 482 change the emission color or change the emission form (e.g., between lighting and blinking) to provide various kinds of information to the user P. Light from the rotary beacon light 60 provided on the inner surface of the long hole 16 of the support portion 14 is reflected by the reflecting surface on the opposite side of the long hole 16, and radiates the inner surface of the arm 40. Therefore, the user P can see the light from the rotary beacon light 60 reflected by the inner surface of the arm 40 in addition to the arm lamps 481 and 482.

The customer service device 20 has the display screen 22 of, for example, a size of 15 inches. The display screen 22 is a touch panel capable of accepting various input operations by the user P. The width of the customer service device 20 in the horizontal direction is slightly smaller than the width of the storage space S in which the basket 2 is placed.

The customer service device 20 is sized to fit inside the arm 40 when the arm 40 is flipped to the stowed position of FIG. 3.

The customer service device 20 is rotatable with respect to the upper end 142 of the support portion 14 about a rotation shaft 24 provided at a lower end thereof. The rotation shaft 24 extends in the horizontal direction. The customer service device 20 can adjust the vertical angle of the display screen 22 by rotating about the rotation shaft 24. The angle of the customer service device 20 is adjusted manually by the user P.

The customer service device 20 includes, for example, a scanner 26 for registering an item under the display screen 22. The scanner 26 reads an item code such as a bar code attached to the item. The scanner 26 may be a camera having a function of capturing a face image for face authentication of the user P. When the scanner 26 is used as a camera, an item may be specified from its image obtained by photographing the item. In addition, the customer service device 20 includes a camera 28 for photographing the inside of the store on the back side near the upper end thereof (see FIG. 2). The hardware configuration of the customer service device 20 will be described in detail later. The arrangement location of the scanner 26 for reading an item code need not be limited to the lower side of the display screen 22. For example, the scanner 26 (or camera) may be disposed at a suitable position on the upper, lower, left, and right sides of the display screen 22 of the customer service device 20. Alternatively, the scanner 26 (or camera) may be located at a suitable location inside the arm 40.

Figure 4A:
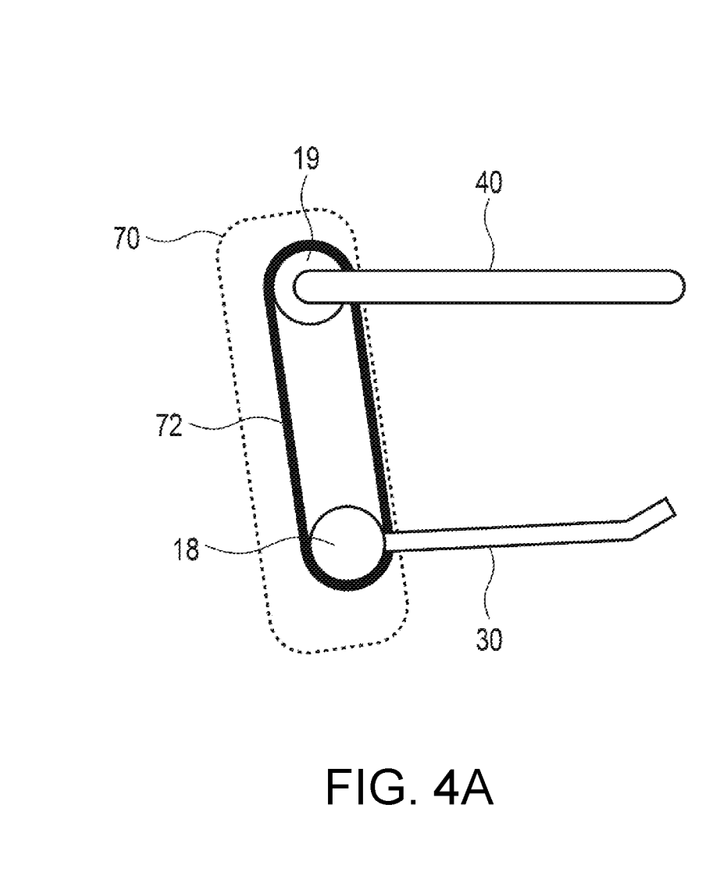
FIGS. 4A and 4B are diagrams of an interlocking mechanism that interlocks a basket table and an arm of the shopping cart.
Figure 4B:
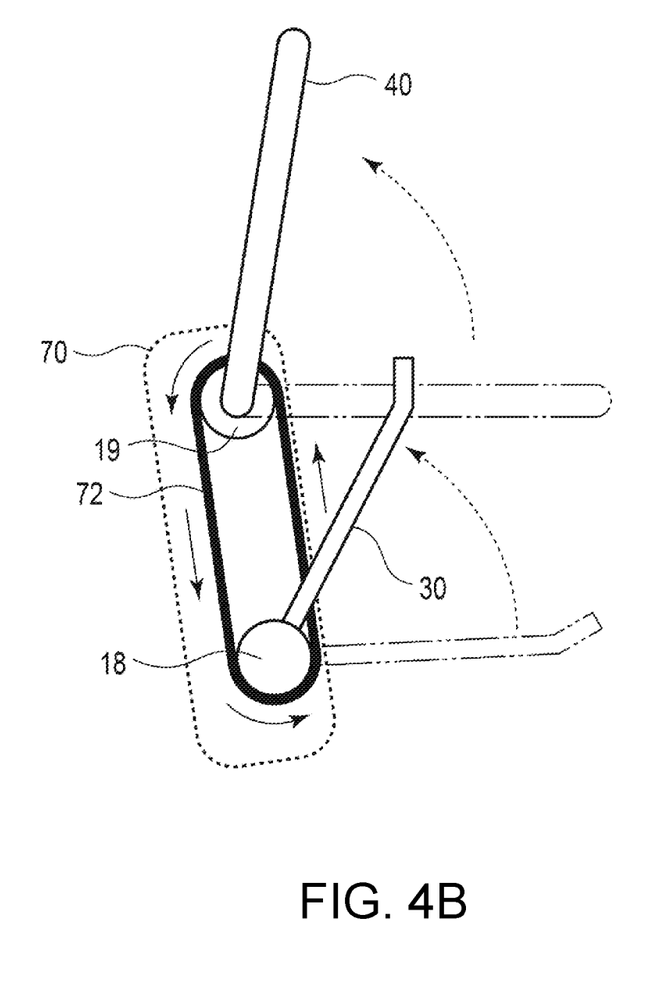

The basket table 30 and the arm 40 may be coupled by a coupling mechanism 70 shown in FIGS. 4A and 4B. FIG. 4A is a diagram in which the basket table 30 and the arm 40 connected by the coupling mechanism 70 are both in the use state, and FIG. 4B is a diagram in which the basket table 30 and the arm 40 are both in the stored state. The coupling mechanism 70 functions to rotate the arm 40 from the used state to the stored state in conjunction with the operation of rotating the basket table 30 from the used state to the stored state. Further, the coupling mechanism 70 functions to rotate the arm 40 from the stored state to the used state in conjunction with the operation of rotating the basket table 30 from the stored state to the used state.

The coupling mechanism 70 is, for example, a mechanism in which an endless toothed belt 72 is hung around a gear provided on the rotation shaft 18 of the basket table 30 and a gear provided on the rotation shaft 19 of the arm 40. The basket table 30 and the arm 40 coupled by the coupling mechanism 70 can be manually operated by the user P. Alternatively, the drive motor may be connected to the rotation shaft 18 of the basket table 30, and the basket table 30 and the arm 40 may be rotated in conjunction with each other by electric motion.

Further, the coupling mechanism 70 may include a clutch mechanism in the rotation shaft 19 of the arm 40 so as to be able to rotate the arm 40 independently of the basket table 30. For example, the arm 40 may include a switch for actuating the clutch mechanism to allow free rotation of the arm 40 independent of the basket table 30 while the switch is being depressed. Accordingly, the arm 40 can be arranged in the above-described use state, the stored state, and the tilted state regardless of the state of the basket table 30.

Figure 6A:
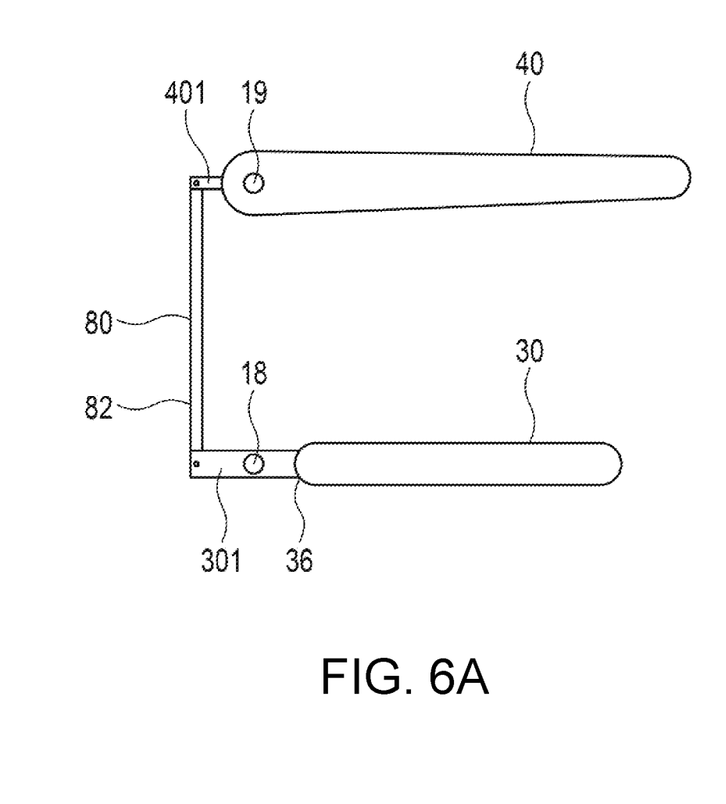
FIGS. 6A and 6B are diagrams illustrating another example of an interlocking mechanism that interlocks the basket table and the arm of the shopping cart.
Figure 6B:
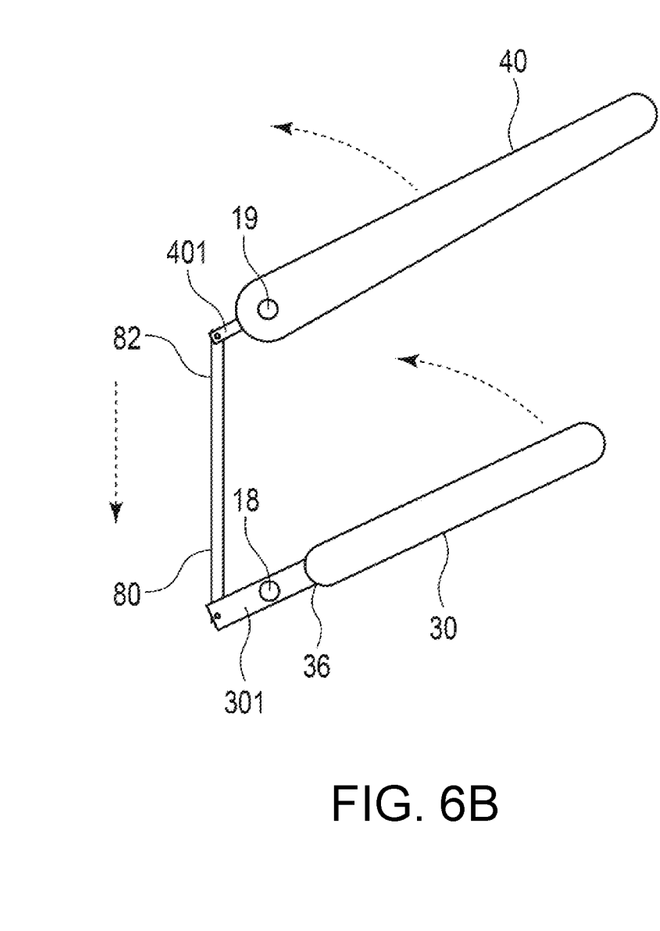

Alternatively, the basket table 30 and the arm 40 may be coupled by a coupling mechanism 80 shown in FIG. 6. The coupling mechanism 80 has, for example, a structure in which an end portion of a projection 301 protruding from the rotation base end 36 of the basket table 30 is separated from the rotation shaft 18, and an end portion of the projection 401 protruding from the base end of the rotation of the arm 40 is separated from the rotation shaft 19 so as to be rotatably coupled by the link arm 82.

Figure 7:
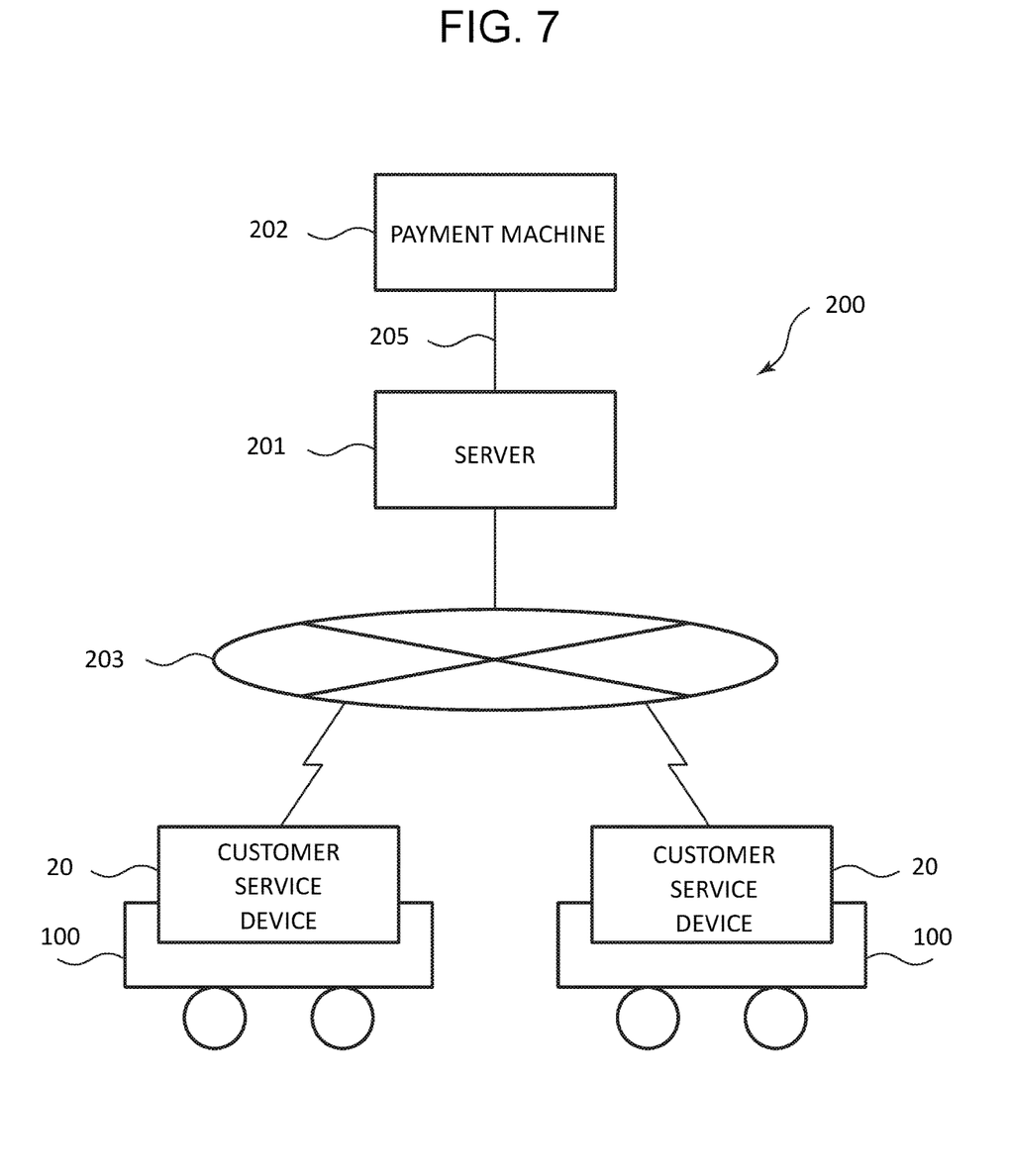
FIG. 7 is a diagram of an item sales processing system including shopping carts.

The store using the shopping cart 100 described above has an item sales processing system 200 illustrated in FIG. 7. The item sales processing system 200 includes a server 201, a payment machine 202, a plurality of customer service devices 20 each attached to a corresponding shopping cart 100, and a network 203. The network 203 is, for example, a wireless Local Area Network (LAN).

The server 201 is a computer that plays a central role in the item sales process. The customer service device 20 displays various types of information for the user P who uses the shopping cart 100 and accepts registration of an item by the user P. The customer service device 20 includes a wireless communication device and performs wireless data communication with the server 201 connected via the network 203. The payment machine 202 checks out the item registered by the user P via the customer service device 20. The server 201 and the payment machine 202 are connected via a dedicated communication line 205.

The customer service device 20 transmits data related to the registration of the item to be purchased read by the scanner 26 to the server 201 via the network 203. The data related to the registration of the item to be purchased is, for example, an item code thereof. An item code is a unique code set for each item in order to identify each item. The data related to the registration of the item to be purchased may include the quantity of each item to be purchased.

The server 201 generates data necessary for checkout based on the data transmitted from the customer service device 20. The server 201 transmits the data necessary for the checkout to the payment machine 202 via the communication line 205. The payment machine 202 checks out the items to be purchased by the user P based on the data received from the server 201.

Figure 8:
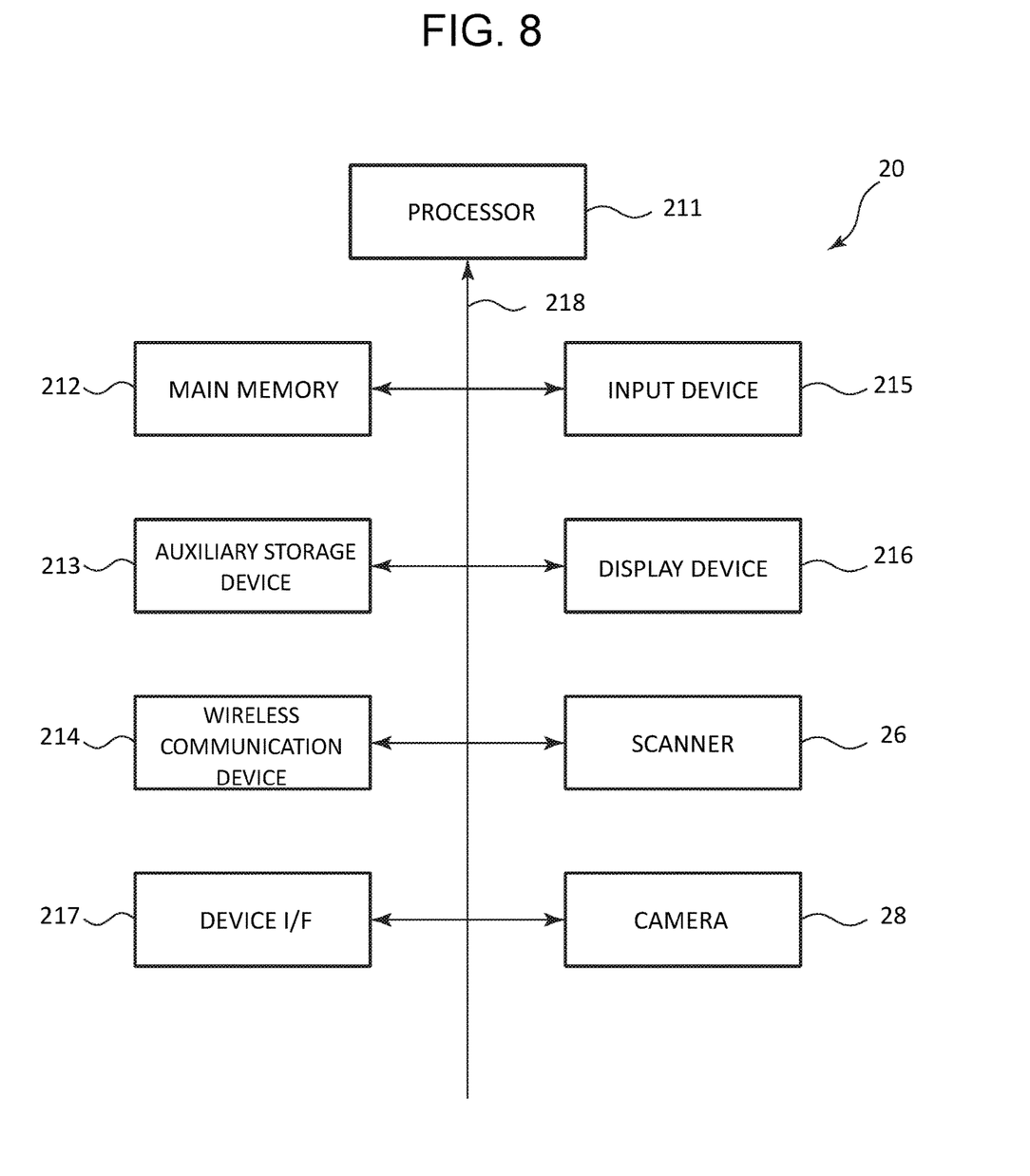
FIG. 8 is a block diagram of a customer service device of the shopping cart.

As illustrated in FIG. 8, the customer service device 20 includes a processor 211, a main memory 212, an auxiliary storage device 213, a wireless communication device 214, an input device 215, a display device 216, a scanner 26, a camera 28, a device interface (I/F) 217, and a system transmission path 218. The system transmission path 218 includes an address bus, a data bus, a control signal line, and the like. The system transmission path 218 connects the processor 211 and each of the other units directly or via a signal input/output circuit, and transmits data signals to and from each other. The processor 211, the main memory 212, and the auxiliary storage device 213 are connected to each other via a system transmission path 218 to constitute a controller of the customer service device 20.

The processor 211 is a core component of the customer service device 20. The processor 211 controls each unit in accordance with an operating system and an application program so as to perform various functions as the customer service device 20. The processor 211 is, for example, a Central Processing Unit (CPU).

The main memory 212 includes a non-volatile memory area and a volatile memory area. The non-volatile memory area of the main memory 212 stores an operating system and/or application programs. The non-volatile or volatile memory area of the main memory 212 may store data necessary for the processor 211 to execute processing for controlling each unit. The volatile memory area of the main memory 212 is used as a work area in which data is rewritten by the processor 211. The non-volatile memory area is, for example, a read only memory (ROM). The volatile memory area is, for example, a random access memory (RAM).

The auxiliary storage device 213 is, for example, an electric erasable programmable read-only memory (EE-PROM®), a hard disk drive (HDD), or a solid state drive (SSD). The auxiliary storage device 213 stores data used by the processor 211 to perform various types of processing, data created by processing by the processor 211, and the like. The auxiliary storage device 213 may store the above-described application program.

The wireless communication device 214 is a network interface circuit for performing data communication according to a wireless communication protocol. The processor 211 controls the wireless communication device 214 to perform data communication with the server 201 via the network 203.

The input device 215 is a device for receiving an operation input from a user. The display device 216 is a device for displaying information to a user. The input device 215 and the display device 216 may integrally constitute the touch panel of the display screen 22 described above.

The scanner 26 is a device for reading an item code and registering an item. The camera 28 is a device for photographing the inside of the store. The device interface 217 is for connecting the customer service device 20 and the weight sensor, the arm lamps 481 and 482, and the rotary beacon light 60 of the basket table 30.

Hereinafter, a method of using the shopping cart 100 according to the present embodiment and its operations and effects will be described.

As illustrated in FIG. 3, a plurality of shopping carts 100 may be stored in a cart storage area at a predetermined location in a store in an overlapping manner. When the used shopping cart 100 is stored in the cart storage area, the user P flips up the arm 40 to the stored state. In the case of the shopping cart 100 provided with the coupling mechanism 70, the basket table 30 is also rotated to the stored state in conjunction with the arm 40. In this state, the arm 40 and the basket table 30 can be arranged in the vertical direction to be compactly stored, and a plurality of shopping carts 100 can be overlapped and nested in the front and rear directions. Further, when the arm 40 is rotated to the stored state, the arm 40 can be disposed around the customer service device 20, and the customer service device 20 can be protected.

When no coupling mechanism 70 is provided, the user P can independently rotate the arm 40 and the basket table 30. Further, even if the coupling mechanism 70 is provided, the user P can rotate the arm 40 independently of the basket table 30 by operating a clutch. As in the present embodiment, by having a structure in which the arm 40 and the basket table 30 can be rotated in the stored state, even in a layout in which the customer service device 20 is disposed on the back side of the storage space S in which the basket 2 is disposed, the shopping cart 100 can be stored in the cart storage area in an overlapping manner.

The shopping cart 100 may turn on and off the customer service device 20 in accordance with the rotation position of the basket table 30. That is, when the basket table 30 is rotated from the stored state to the used state, the customer service device 20 may be automatically turned on, and when the basket table 30 is rotated from the used state to the stored state, the customer service device 20 may be automatically turned off.

When the stacked shopping cart 100 is used, the user P turns the arm 40 to the use state by holding the gripping portion 42, and pulls the shopping cart 100 out of the cart storage area to the front side. At this time, the basket table

30 is also rotated to the use state in conjunction with the arm 40. This state is shown in FIG. 1. Thereafter, the user P places an empty basket 2 in the storage space S from above the arm 40 on the basket table 30. This state is shown in FIG. 3.

As shown in FIG. 5, the user P may move the arm 40 to the tilted state and then place the basket 2 on the basket table 30. In this case, the clutch of the coupling mechanism 70 can be disengaged, and the arm 40 can be rotated to the tilted state independently of the basket table 30. As a result, the user P can easily place the basket 2 on the basket table 30. When the basket 2 is taken out from the basket table 30 after the shopping is finished, the basket 2 can be easily taken out by rotating the arm 40 from the use state of FIG. 3 to the tilted state of FIG. 5. Alternatively, when the basket 2 is placed on or taken out of the basket table 30, the arm 40 may be flipped up to the stored state independently of the basket table 30.

In addition, the shopping cart 100 of the present embodiment can move the arm 40 and the basket table 30 to the use state without being pulled out from the storage place in the overlapping state. For this reason, unlike a conventional shopping cart, there is no need to take out the shopping cart 100 from the storage place to put a basket 2 thereon, thereby improving convenience.

Further, according to the present embodiment, it is also possible to overlap the shopping cart 100 on which the basket 2 containing the item is placed in the cart storage place. In this case, as shown in FIG. 3, after the shopping cart 100 on which the basket 2 is placed is overlapped with another shopping cart 100, only the arm 40 may be rotated to ag tilted state to take out the basket 2. After the basket 2 is taken out, the arm 40 and the basket table 30 may be rotated to the stored state in order to overlap the next shopping cart 100.

When shopping is performed using the shopping cart 100, the user P moves inside the store by pushing the shopping cart 100 having the basket 2 set. The user P takes an item to be purchased, scans the item code over the scanner 26 of the customer service device 20, reads the item code, and puts the item into the basket 2. Since the scanner 26 is located near the lower end of the customer service device 20 located at the back of the basket 2, the user P can put the item read by the scanner 26 into the basket 2 as it is without moving almost from the position, and can shop in a flow-like operation.

In addition, when an item to which an item code is not assigned is registered, when a coupon is displayed, when a shopping history is displayed, when an item flicker of a store is displayed, or the like, the user P can register the item by operating the customer service device 20 or display various kinds of information. In this case, the user P can extend his/her hand from the front side of the basket 2 and touch the display screen 22 of the customer service device 20 to input necessary information. At this time, since the storage space S for accommodating the basket 2 is horizontally long, it is easy for the user P to operate the display screen 22. Note that the customer service device 20 can constantly display information on recommended items or display a character for each sales area via the display screen 22.

Further, in the shopping cart 100 of the present embodiment, since the customer service device 20 is located at the back of the basket 2, the customer service device 20 does not become an obstacle when an item is put into the basket 2, and the item in the basket 2 is not hardly visible by the customer service device 20. Therefore, the display screen 22 of the customer service device 20 can be enlarged, and sufficient and meaningful information can be provided to the user P. That is, it can be said that the shopping cart 100 of the present embodiment is easy to use and convenient for the user P.

Further, the shopping cart 100 photographs the inside of the store with the camera 28 on the back of the customer service device 20, and displays the graphic of the direction instruction on the camera image of the inside of the shop photographed on the display screen 22 in a superimposed manner, and can guide the user P along with the map of the inside of the shop displayed on the display screen 22 to the item desired to be purchased. In this case, the user P operates the customer service device 20 to search for an item desired to be purchased. The customer service device 20 displays a map in the store via the display screen 22, and displays, on the map, a travel route from the position of the shopping cart 100 to an item that the user P desires to purchase. The position of the shopping cart 100 to be moved moves on the map displayed via the display screen 22.

In addition, the shopping cart 100 can capture an image of an item on an item shelf with the camera 28 of the customer service device 20 and acquire information on the imaged item from the server 201. The acquired information can be displayed via the display screen 22 of the customer service device 20. At this time, the information regarding the item to be provided to the user P includes an image of the item, a price, discount information, a coupon, information regarding a related item, and the like.

In addition, the shopping cart 100 can capture an image of the inside of the store by the camera 28 of the customer service device 20, detect an obstacle or a person on the moving route of the shopping cart 100, display a warning via the display screen 22, or issue a warning via the arm lamps 481 and 482.

In addition, the shopping cart 100 can capture a real-time image in the store by the camera 28 of the customer service device 20, display the congestion state via the display screen 22, and transmit the image to the server 201. The store clerk can view the real-time image transmitted to the server 201 to grasp the inventory status of items, crowd status, and the like.

In addition, when the scanner 26 of the customer service device 20 is a camera, the shopping cart 100 can determine that an unregistered item has been inserted into the basket 2, and can issue a warning to the user P via the arm lamps 481 and 482 and notify the store clerk via the rotary beacon light 60. For example, when an item is registered via the scanner 26, the arm lamps 481 and 482 are turned on in blue, and when the item is inserted into the basket 2 without being registered, the arm lamps 481 and 482 are turned on and off in orange.

In addition, in the shopping cart 100, when the scanner 26 of the customer service device 20 is a camera, when the user P returns an item placed in the basket 2 after registration to the item shelf, it can monitor whether the user P has re-scanned the item and can issue a warning via the arm lamps 481 and 482 when the user P has forgotten to re-scan the item.

In addition, when the scanner 26 of the customer service device 20 is a camera, the shopping cart 100 can capture a face image of the user P and determine whether the user P is a user P who is registered as a member of the store. In addition, when the basket 2 is placed in the storage space S, the basket 2 is photographed, and it is possible to determine whether the basket 2 is a shopping basket provided by a store or a shopping bag possessed by the user P.

Further, the shopping cart 100 can measure the weight of the basket 2 placed on the basket table 30 via a weight sensor provided on the basket table 30. The weight of the basket 2 changes each time an item is put into the basket 2. The shopping cart 100 determines from the image via the scanner 26 that the empty basket 2 has been placed on the basket table 30, and at this point, measures the weight of the basket 2 via the weight sensor and automatically sets the output of the weight sensor to zero. Alternatively, the weight of only the item obtained by subtracting the weight of the basket 2 may be measured each time the measurement value of the weight sensor is changed by inserting the item into the basket 2.

In addition, the shopping cart 100 can notify the user P and the store clerk of the state of the shopping cart 100 via the rotary beacon light 60. For example, in a state in which the shopping cart 100 is stored in a cart storage place in an overlapping manner and the battery is charged, the rotary beacon light 60 may be turned on in orange when the battery is being charged, and the rotary beacon light 60 may be turned on in green when the battery is fully charged. Incidentally, in order to inform the user P and the store clerk of the state of the battery (e.g., during charge or fully charged), a lamp may be provided in the gripping portion 42 of the arm 40, it is possible to make the lamp visible even in the overlapping state.

In addition, while the user P is shopping using the shopping cart 100, the rotary beacon light 60 may be turned on in blue, the rotary beacon light 60 may be turned on in green when the user P has paid an account, the rotary beacon light 60 may be turned on in orange when an error or a failure occurs, and the rotary beacon light 60 may be turned on in yellow when there is an illegality or a mistake. In addition, when a predetermined operation is performed by the user P via the customer service device 20, the rotary beacon light 60 may be turned on or off in order to call the store clerk.

Figure 9:
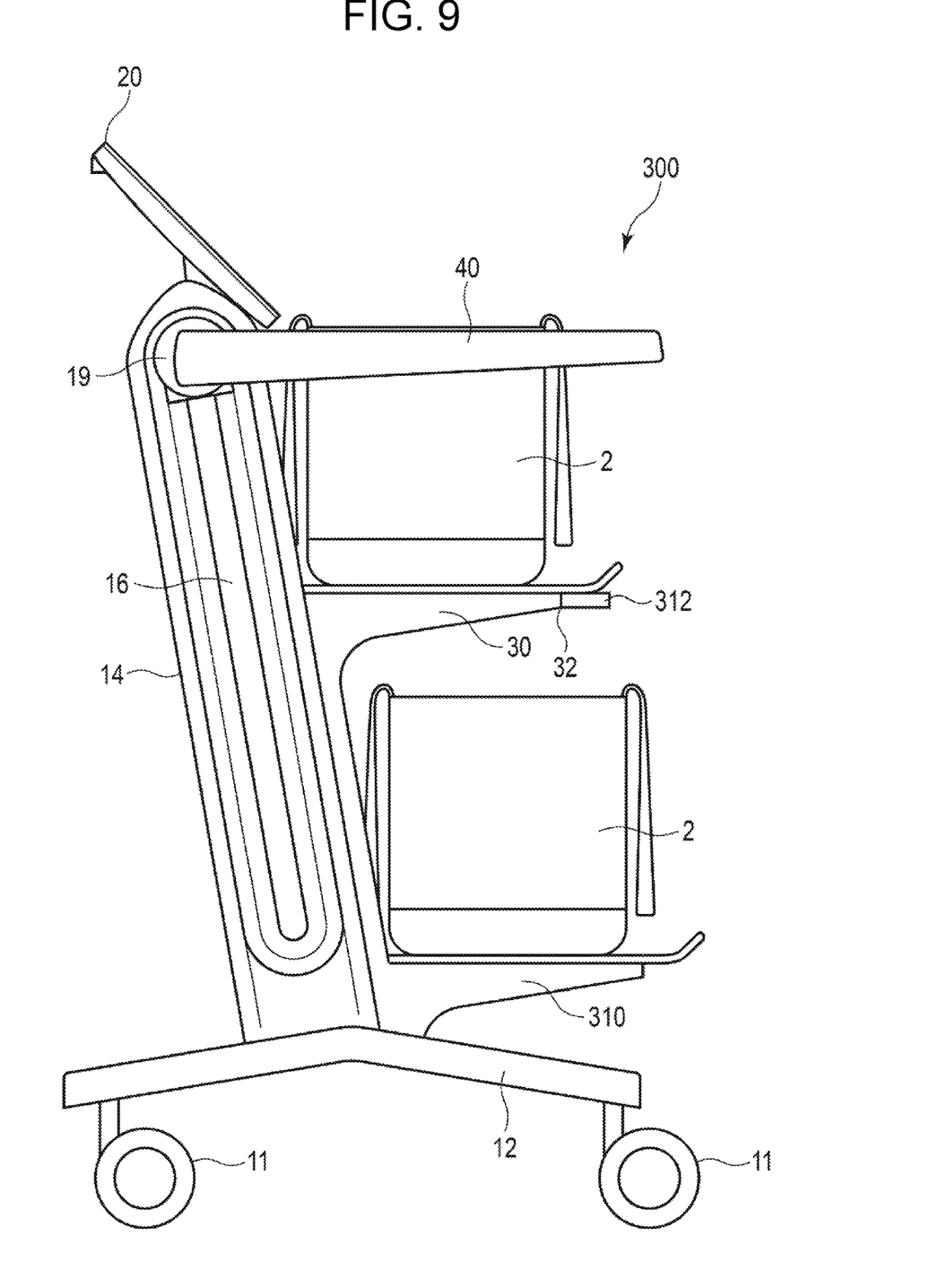
FIG. 9 is a side view of the shopping cart including upper and lower basket tables.

As illustrated in FIG. 9, the shopping cart 300 may include upper and lower basket tables 30 and 310. In this case, the scanner 312 may be provided at the front edge 32 of the upper basket table 30 in order to read the item to be placed in the lower basket 2. Since the support portion 14 of the cart body 10 is inclined rearward upward, the basket 2 placed on the basket table 310 at the lower stage than the basket 2 placed on the basket table 30 at the upper stage is positioned forward. By shifting the two-stage baskets 2 forward and backward in this manner, it is possible to facilitate the taking in and out of the items with respect to each basket 2.

In the above-described embodiment, the arm 40 is formed in an annular shape, but it may be separated at the center of the gripping portion 42. In this case, the baggage or the like of the user P can be hooked from the separation portion of the gripping portion 42. In addition, in the above-described embodiment, the arm 40 is rotatable about the rotation shaft 19 in the use state, the stored state, and the tilted state, but a structure capable of sliding in the vertical direction may be provided by using the long hole 16 provided in the support portion 14 of the cart body 10. Further, in the shopping cart 100 including the upper and lower two-stage basket tables 30 and 310, a guide or the like for preventing the lower-stage basket 2 from falling off may be provided.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A shopping cart, comprising:
   a cart body;
   a handle attached to the cart body on a front side thereof;
   a terminal attached to the cart body and including a display screen on a rear side of the cart body and on which information of an item stored in the shopping cart can be displayed; and
   a basket table attached to the cart body at a position lower than the display screen and the handle and located between the display screen and the handle when viewed from above, wherein
   the handle is movable to a position above the display screen.

2. The shopping cart according to claim 1, wherein a length of the basket table in a first direction along which the handle extends is longer than a length of the basket table in a second direction crossing the first direction.

3. The shopping cart according to claim 1, wherein the terminal includes a scanner adjacent to the display screen for scanning an item.

4. The shopping cart according to claim 1, wherein the basket table is rotatable between a first position at which a surface of the basket table is parallel to a floor and a second position at which the surface is vertical or substantially vertical to the floor.

5. The shopping cart according to claim 1, further comprising:
   an arm including the handle and rotatable between a first position at which the handle is on the front side of the cart body and a second position at which the handle is above the display screen.

6. The shopping cart according to claim 5, wherein the arm at the first position surrounds the basket table when viewed from above.

7. The shopping cart according to claim 5, further comprising:
   an interlocking mechanism that interlocks the basket table with the arm, wherein
   when the arm rotates from the first position to the second position, the interlocking mechanism causes the basket table to also rotate from a first position at which a surface of the basket table is parallel to a floor to a second position at which the surface is vertical or substantially vertical to the floor.

8. The shopping cart according to claim 1, further comprising:
   a lamp, wherein
   the cart body includes a support extending vertically or substantially vertically and having a hole that penetrates the support in a direction parallel to the handle, and
   the lamp is disposed in the hole.

9. The shopping cart according to claim 8, further comprising:
   a reflective surface facing the lamp in the hole.

10. A cart, comprising:
    a cart body;
    a terminal attached to the cart body and including a display screen on which information of an item stored in the cart can be displayed;

a handle attached to the cart body and movable between a first position at which the handle is on a front side of the cart body and a second position at which the handle is on a rear side of the cart body and above the display screen; and a table attached to the cart body below the display screen and rotatable between a first position at which a surface of the table is parallel to a floor and a second position at which the surface is vertical or substantially vertical to the floor.

11. The cart according to claim 10, wherein a length of the table in a first direction along which the handle extends is longer than a length of the table in a second direction crossing the first direction.

12. The cart according to claim 10, wherein the terminal includes a scanner adjacent to the display screen for scanning an item.

13. The cart according to claim 10, further comprising:
an arm that includes the handle and surrounds the table when the handle is at the first position when viewed from above.

14. The cart according to claim 10, further comprising:
a lamp, wherein
the cart body includes a support extending vertically or substantially vertically and having a hole that penetrates the support in a direction parallel to the handle, and
the lamp is disposed in the hole.

15. The cart according to claim 14, further comprising:
a reflective surface facing the lamp in the hole.

16. A sales data processing system, comprising:
a server configured to manage sales data; and
a shopping cart configured to register an item for purchase and transmit information of the registered item to the server, the shopping cart including:
a cart body,
a handle attached to the cart body on a front side thereof,
a terminal attached to the cart body and including a display screen on a rear side of the cart body and on which information on an item stored in the shopping cart can be displayed, and
a basket table attached to the cart body at a position lower than the display screen and the handle and located between the display screen and the handle when viewed from above, wherein
the handle is movable to a position above the display screen.

17. The sales data processing system according to claim 16, wherein a length of the basket table in a first direction along which the handle extends is longer than a length of the basket table in a second direction crossing the first direction.

18. The sales data processing system according to claim 16, wherein the terminal includes a scanner adjacent to the display screen for scanning an item.

19. The sales data processing system according to claim 16, wherein the basket table is rotatable between a first position at which a surface of the basket table is parallel to a floor and a second position at which the surface is vertical or substantially vertical to the floor.

* * * * *